(12) United States Patent
Guignard et al.

(10) Patent No.: US 11,456,849 B2
(45) Date of Patent: Sep. 27, 2022

(54) METHOD AND APPARATUS FOR SYNCHRONIZING DIFFERENT COMMUNICATION PORTS

(71) Applicant: CANON KABUSHIKI KAISHA, Tokyo (JP)

(72) Inventors: Romain Guignard, Rennes (FR); Yacine El Kolli, Rennes (FR); Tristan Halna Du Fretay, Langan (FR); Lionel Tocze, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/339,377

(22) Filed: Jun. 4, 2021

(65) Prior Publication Data

US 2021/0385058 A1 Dec. 9, 2021

(30) Foreign Application Priority Data

Jun. 9, 2020 (GB) .................................... 2008745

(51) Int. Cl.
*G06F 15/16* (2006.01)
*H04L 7/00* (2006.01)
*H04L 41/0677* (2022.01)
*H04L 69/28* (2022.01)

(52) U.S. Cl.
CPC ........ *H04L 7/0008* (2013.01); *H04L 41/0677* (2013.01); *H04L 69/28* (2013.01)

(58) Field of Classification Search
CPC .... H04L 7/0008; H04L 41/0677; H04L 69/28
USPC .................................................... 709/203, 208
See application file for complete search history.

(56) References Cited

U.S. PATENT DOCUMENTS

| | | | | |
|---|---|---|---|---|
| 2003/0177154 A1* | 9/2003 | Vrancic | .................... | G06F 1/12 708/160 |
| 2006/0245454 A1* | 11/2006 | Balasubramanian | ........................ | H04L 12/4625 370/509 |
| 2014/0010244 A1* | 1/2014 | Bui | ........................ | H04J 3/0667 370/503 |
| 2014/0226459 A1* | 8/2014 | Edmiston | .......... | H04L 12/40189 370/254 |
| 2016/0080100 A1* | 3/2016 | Yan | ........................ | H04J 3/0641 370/216 |
| 2019/0138047 A1* | 5/2019 | El Kolli | .................... | G06F 1/12 |

\* cited by examiner

*Primary Examiner* — Duyen M Doan
(74) *Attorney, Agent, or Firm* — Canon U.S.A., Inc. IP Division (57) ABSTRACT

A method of synchronization of a communication device comprising a first and second communication ports, each of the first and second communication port being associated with a respective first and second time system, the method comprising a regular master synchronization process synchronizing regularly the first time system with an external synchronization server according to a time synchronization protocol; a regular slave synchronization process synchronizing regularly the second time system with the first-time system; detecting a loss of synchronization between the first and second time system; determining which of the first and second time system is desynchronized; and synchronizing the desynchronized time system with the other one.

12 Claims, 8 Drawing Sheets

METHOD AND APPARATUS FOR SYNCHRONIZING DIFFERENT COMMUNICATION PORTS

CROSS REFERENCE TO RELATED APPLICATION

This application claims the benefit under 35 U.S.C. § 119(a)-(d) of United Kingdom Patent Application No. 2008745.8, filed on Jun. 9, 2020 and entitled "METHOD AND APPARATUS FOR SYNCHRONIZING DIFFERENT COMMUNICATION PORTS". The above cited patent application is incorporated herein by reference in its entirety.

FIELD OF DISCLOSURE

The present disclosure concerns a method and a device for synchronizing different clocks associated with different network ports of a communicating computing device. It concerns more particularly systems having different ports, where at least one port is a master port synchronized with a server while at least a second port is a slave port synchronized with the master port.

BACKGROUND

The master port is connected to a communication network by a link associated to the port. The master port can communicate with a server acting as a synchronization server. In order to synchronize its clock with the clock of the synchronization server, the master clock implements a synchronization protocol, like PTP (Precision Time Protocol).

The slave port synchronizes its own clock with the clock of the master port using a synchronization process called discipline process. The discipline process is typically executed continuously in order to keep the slave clock synchronized with the master clock.

When the system is started, the master port synchronizes its clock with the synchronization server, using typically PTP. The slave port synchronizes its own clock with the clock of the master port using a discipline engine. The process takes typically a few tens of seconds to stabilize the clock in a synchronized state.

When running, the synchronization may be lost. For example, a failure may occur on the link between the master port and the network. In that case, the synchronization protocol ceases to operate and the master port loses its synchronization with the synchronization server. When the link recovers, the master port has to synchronize anew with the synchronization server, and then the slave port has to resynchronize with the master port. This process takes typically the same time as it takes at initialization. This is due, inter alia, to the fact that when the link is up, the connection implies some auto negotiation steps that affect the clock registers.

While this synchronization time might be considered acceptable at start-up, any improvement of the synchronization time after a transient synchronization loss is advantageous.

SUMMARY

The present disclosure has been devised to address one or more of the foregoing concerns. According to an aspect of the disclosure, when a synchronization loss is detected, it is determined which of the ports is desynchronized. At recovery, the desynchronized port is first synchronized with the other one, before resuming the synchronization processes. For example, if the master port suffers a link failure and loses its synchronization, the slave port continues to run freely. At recovery, the slave port is likely to be close to be still synchronized with the server, while the reconnection of the master port has introduced a perturbation of the master port clock. In this example, by introducing a first synchronization step of the master port to the slave port before resuming the synchronization of the master port with the synchronization server, the convergence time of this synchronization with the synchronization server is reduced.

According to a first aspect of the disclosure, there is provided a method of synchronization of a communication device comprising a first and second communication ports, each of the first and second communication port being associated with a respective first and second time system, the method comprising:

a regular master synchronization process synchronizing regularly the first time system with an external synchronization server according to a time synchronization protocol;

a regular slave synchronization process synchronizing regularly the second time system with the first-time system;

detecting a loss of synchronization between the first and second time system;

determining which of the first and second time system is desynchronized; and, synchronizing the desynchronized time system with the other one.

In an embodiment, the desynchronized time system is the first time system, and wherein the method further comprises afterward:

resuming the regular master synchronization process.

In an embodiment, the method further comprises:

suspending the regular slave synchronization process when the determined desynchronized time system is the second time system; and resuming the regular slave synchronization process after the step of synchronizing the desynchronized time system with the other one.

In an embodiment, detecting a loss of synchronization is made by detecting an offset between the first and second time system greater than a determined threshold.

In an embodiment, detecting a loss of synchronization is made by detecting a link failure on a port associated with a time system.

In an embodiment, upon detection of a link failure, the method comprises:

enabling a flag to force the synchronization at link recovery; and marking the port on which the link failure is detected as down.

In an embodiment, time protocol messages received are discarded before resuming the regular master synchronization process.

In an embodiment, time protocol messages carrying timestamps received are discarded before resuming the regular master synchronization process.

In an embodiment, the first and second time system use the same oscillator.

In an embodiment, the first and second time system use different oscillators.

According to another aspect of the disclosure, there is provided a computer program product for a programmable apparatus, the computer program product comprising a sequence of instructions for implementing a method according to the disclosure, when loaded into and executed by the programmable apparatus.

According to another aspect of the disclosure, there is provided a computer-readable storage medium storing instructions of a computer program for implementing a method according to the disclosure.

According to another aspect of the disclosure, there is provided a computer program which upon execution causes the method of the disclosure to be performed.

According to another aspect of the disclosure, there is provided a communication device comprising a first and second communication ports, each of the first and second communication port being associated with a respective first and second time system, the device comprising a processor configured for:
  executing a regular master synchronization process synchronizing regularly the first time system with an external synchronization server according to a time synchronization protocol;
  executing a regular slave synchronization process synchronizing regularly the second time system with the first-time system;
  detecting a loss of synchronization between the first and second time system;
  determining which of the first and second time system is desynchronized;
  and
  synchronizing the desynchronized time system with the other one.

At least parts of the method according to the disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the present disclosure can be implemented in software, the present disclosure can be embodied as computer-readable code for provision to a programmable apparatus on any suitable carrier medium. A tangible, non-transitory carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g., a microwave or RF signal.

BRIEF DESCRIPTION OF THE DRAWINGS

Embodiments of the disclosure will now be described, by way of example only, and with reference to the following drawings in which.

Any step of the algorithms of the disclosure may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

DETAILED DESCRIPTION

Synchronization of devices connected to the same communication network is a real challenge, in particular in control systems comprising nodes interconnected through router or switch devices that have to be synchronized with the same time reference. The time reference is generally provided by a synchronization server having a high precision clock that may be obtained, for example, from a connection to an atomic clock or to a Global Positioning System (GPS).

The synchronization server typically generates synchronization information related to its local clock (e.g., a frequency and/or a time of day) and sends this information to the other nodes (referred to as slave nodes) within synchronization messages or packets according to a clock synchronization protocol.

When a slave node receives synchronization information, it synchronizes the frequency and/or the time of day of its own clock as a function of that of the synchronization server.

To that end, slave nodes may receive and send data for synchronization through a specific port, for example a port conforming to the precision time protocol (PTP) defined in the IEEE 1588-2008 protocol, as set forth in the document entitled "IEEE Standard for a Precision Clock Synchronization Protocol for Networked Measurements and Control Systems" by IEEE Instrumentation and Measurements Society, Jul. 24, 2008.

Other protocols exist for synchronizing nodes in communication networks such as the network time protocol (NTP).

Figures 1, 2:
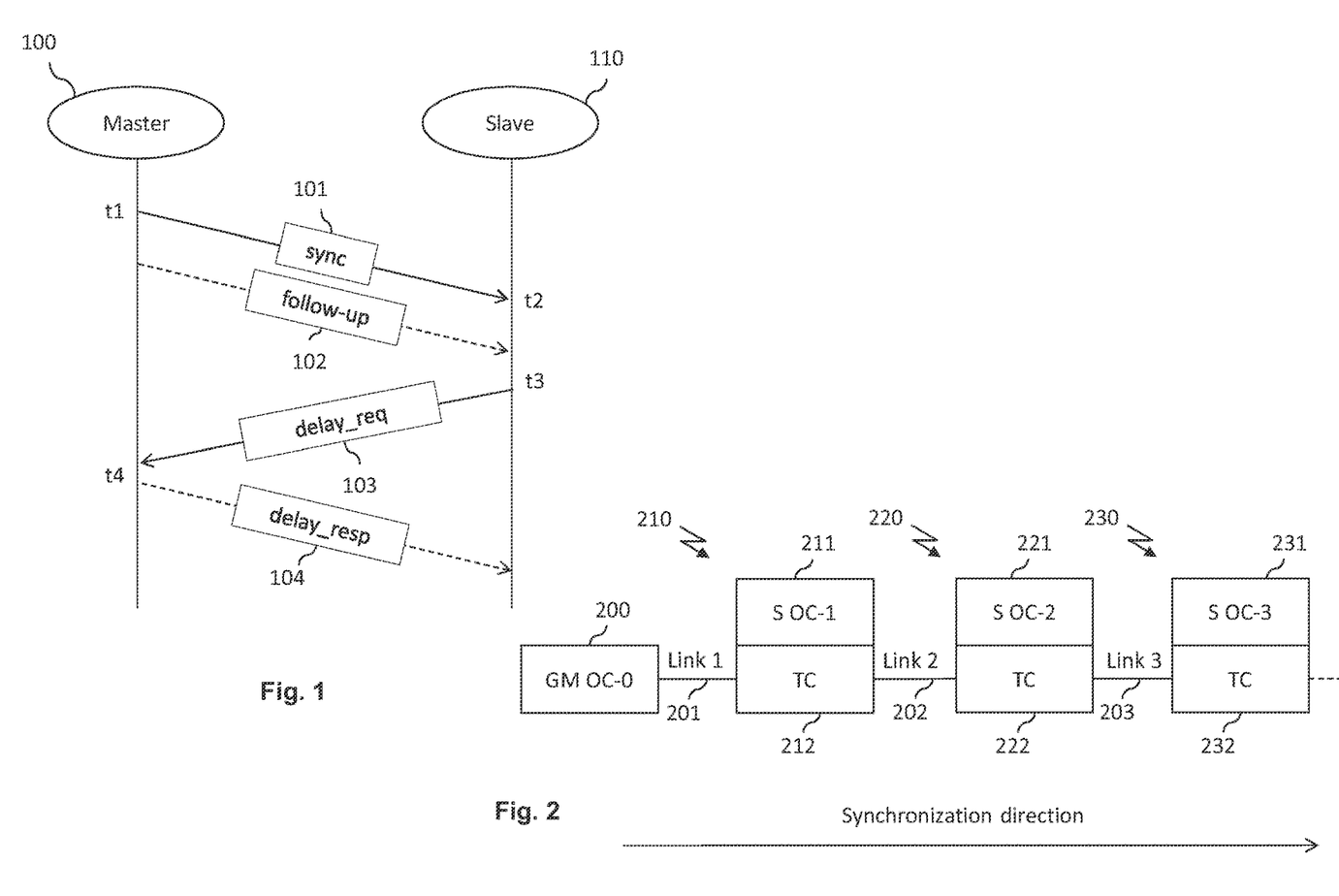
FIG. 1 illustrates schematically an example of exchanges of synchronization messages between a synchronization server and a slave node.
FIG. 2 illustrates an example of a system in which the disclosure can be implemented.

FIG. 1 illustrates schematically an example of exchanges of synchronization messages between a synchronization server and a slave node making it possible to synchronize a clock of the slave node as a function of a clock of the synchronization server. It illustrates the main concept of the master-slave synchronization conforming to the IEEE 1588-2008 standard.

As illustrated, synchronization server 100 sends a synchronization message or packet (Sync) referenced 101 to slave node 110 and generates a first timestamp denoted t1 indicating the time at which synchronization server 100 sent Sync message 101.

For the sake of clarity, it is considered below that in the context of the disclosure there is no meaningful difference between synchronization messages and synchronization packets.

According to a "one-step clock" mechanism, first timestamp t1 is sent to the slave node 110 within Sync message 101. Alternatively, according to a "two-step clock" mechanism and as illustrated in FIG. 1, first timestamp t1 is sent to slave node 110 within a following message (Follow-Up) referenced 102 that is sent by synchronization server 100 to slave node 110 after Sync message 101. The two-step mechanism requires less CPU power for embedding the timestamp in the subsequent message than the one-step mechanism where it must be embedded on the fly in the first message.

Upon reception of Sync message 101, slave node 110 generates a second timestamp denoted t2 indicating the time at which slave node 110 received Sync message 101. Next, slave node 110 sends a request message to synchronization server 100 (Delay_Req) referenced 103, making it possible to compute a transmission delay. When sending Delay_Req message 103, slave node 110 generates a third timestamp denoted t3 indicating the time at which slave node 110 sends this message.

Upon reception of Delay_Req message 103, synchronization server 100 generates a fourth timestamp denoted t4 indicating the time at which it receives this message. This timestamp is sent to slave node 110 within a request response message (Delay_Resp) referenced 104.

After having received Delay_Resp message 104, the four timestamps t1, t2, t3, and t4 are available at slave node 110. They can be used to compute the offset of the slave node clock with regard to the synchronization server clock and a path delay:

$$\text{offset} = \frac{(t_2 - t_1) - (t_4 - t_3)}{2}$$

$$\text{delay} = \frac{(t_2 - t_1) + (t_4 - t_3)}{2}$$

The offset is the difference between the time of the slave node and a reference time or true time of a synchronization server that may be given by the synchronization server clock (or one of the synchronization server clocks if it comprises several clocks).

The delay, or path delay, is the delay associated with the path connecting the synchronization server to the slave node. To compute the path delay, two delay measurements are made: the forward time delay from the synchronization server to the slave node (t2−t1) and the reverse time delay from the slave node to the synchronization server (t4−t3). The path delay is the average of the forward and reverse time delay.

Based on the offset and path delay, slave node 110 is able to synchronize the frequency and the time of day of its local clock to those of synchronization server 100. According to the IEEE 1588-2008 protocol, it is possible to achieve millisecond synchronization accuracy or better according to the timestamp precision.

The exchange of messages illustrated in FIG. 1 is typically periodically repeated in order to synchronize continuously the slave node clock.

A slave node clock locked to a synchronization server clock, as described previously, is known as an ordinary clock (OC). The synchronization mechanism may be referred to as an ordinary clock module.

The synchronization mechanism described by reference to FIG. 1 is very efficient for a point-to-point connection between a synchronization server and a slave node.

However, in a communication network wherein the different nodes are mostly interconnected through router or switch devices, the latter introduce time delay variation on the packet delivery according to the network traffic conditions.

Typically, when a node of a communication network receives a packet through an ingress physical interface (input port), it stores the packet in an ingress FIFO memory (First In/First Out memory), next it processes it in the node and stores it in an egress FIFO memory so that it can be transmitted through an egress physical interface (output port). Accordingly, the packet spends a non-predictable residence time in the node (in the ingress FIFO, in the processing unit, and then in the egress FIFO). This unpredictable time delay variation is particularly critical for synchronization messages since it prevents the slave nodes from retrieving synchronization information from the synchronization server with a high accuracy. Thus, the master-slave synchronization suffers from this unpredictable delay variation.

In response to this problem, the clock synchronization mechanism defined in the IEEE 1588-2008 standard uses a time compensation clock mechanism called transparent clock (TC).

The ordinary clock and the transparent clock are both clock elements of the slave nodes.

The transparent clock module measures the residence time of the synchronization messages (e.g. Sync message 101 and Delay_Req message 103) within the node. This makes it possible for each slave node to synchronize its clock with that of the synchronization server by taking into account the residence times of the synchronization messages within nodes of the communication network. In other words, the use of the measured residence times makes the aforementioned unpredictable delay variation predictable.

According to this clock synchronization mechanism, a node generates an ingress timestamp upon reception of a synchronization message and generates an egress timestamp when it transmits this synchronization message. The residence time of the synchronization message within the node is then computed as the difference between the egress timestamp and the ingress timestamp.

According to the IEEE 1588-2008 protocol, the residence time is accumulated in a dedicated part of the synchronization messages, known as the Correction Field, when the synchronization messages are transmitted from one node to another.

When the "one-step clock" mechanism is used, the computed residence time is embedded in the synchronization messages (e.g. Sync message 101 or Delay_Req message 103) before the synchronization messages are forwarded. More precisely, it is added to the residence time of the synchronization messages that is equal to zero if the synchronization messages are directly received from the synchronization server (or if there is no time delay resulting from the previous nodes) or to the residence times of the previous nodes. Alternatively, when the "two-step clock" mechanism is used, the computed residence time is used to update the correction field of the subsequent synchronization messages (e.g., either Follow-Up message 102 or Delay_Resp message 104 respectively for Sync message 101 or Delay_Req message 103).

In distributed control applications, it is appropriate to use a daisy-chain network topology due to simplified wiring requirements. In this kind of topology, each node of the communication network acts at the same time as an end device and as a switch device. Accordingly, from an IEEE 1588-2008 point of view, each node combines a transparent clock (or a clock having similar properties) for handling switching functionalities and an ordinary clock (or a clock having similar properties) for synchronization of the node (i.e., when it is considered as an end device).

If both functionalities are independent, the ordinary clock and the transparent clock use independent hardware clocks to perform their own functions. Alternatively, both functionalities may share the same physical clock, which is convenient since most of the network adapter boards own only one physical clock per physical interface or one physical clock for all the physical interfaces. Furthermore, using different physical clocks per physical interface would imply not only duplicating the necessary resources (several PTP stacks, several timestamping modules, etc.) but also a complexity rise of the PTP management. In addition, IEEE1588-2008 standard advises sharing a common physical clock for combined ordinary and transparent clocks.

FIG. 2 illustrates an example of a system comprising nodes connected according to the daisy-chain topology, each of the nodes implementing both an ordinary clock and a transparent clock. For the sake of illustration, only four nodes are represented, one synchronization server and three slave nodes.

The synchronization server also called the grand master (GM) and referenced 200 comprises an ordinary clock denoted OC-0 that is to be used as a reference clock for synchronization of the slave node clocks. Each of the slave nodes (S) referenced 210, 220, and 230 comprises an ordinary clock (OC) referenced 211, 221, and 231, respectively, that should be synchronized with the grand master clock, and a transparent clock (TC) referenced 212, 222, and 232, respectively, that is in charge of computing the residence time and of inserting it in the forwarded synchronization messages (e.g. Sync message 101 or Delay_Req message 103 coming from the synchronization server or from the slave nodes).

The nodes are linked to each other according to daisy-chain links referenced 201, 202, and 203. Therefore, the ordinary clock 211 of slave node 210 is synchronized using synchronization messages directly received from grand master 200, the ordinary clock 221 of slave node 220 is synchronized using synchronization messages received from grand master 200 via slave node 210, updated by transparent clock 212 of slave node 210 (insertion of the residence time in the Correction Field), and the ordinary clock 231 of slave node 230 is synchronized using synchronization messages received from grand master 200 via slave nodes 210 and 220, updated by transparent clocks 212 and 222 of slave nodes 210 and 220, respectively.

For the aforementioned description, it is obvious that the synchronization accuracy of the whole system (especially in daisy-chain topology) depends directly on the accuracy of the residence time and consequently on the coherency between the clock of the ingress and the clock of the egress ports responsible, respectively, to generate ingress and egress timestamps. As a result, the computed residence time value is accurate because both timestamps are generated from a same clock counter reference. However, if the timestamps are generated from independent clock counters, as is frequently the case in a Network Adapter implementation, the resulting computed residence time may be inaccurate. This is due to inconsistencies such as jitter or errors between timestamps that are typically caused by rate changes of the local clock. Also, syntonized peer-to-peer TC may delay clock adjustment after packet forwarding, while syntonized end-to-end TC may not be able to delay clock adjustment because of the unpredictable arrival time of delay request messages. We remind here that syntonized clocks progress at the same rate but may have an offset while synchronized clocks progress at the same rate without offset. Co-located OC/TC cannot delay clock adjustment without jeopardizing the user application accuracy.

Therefore, the residence time calculation is biased, since it is computed based on the difference between the values of two unrelated time counters. This is an important issue in cascaded networks since errors accumulate from node to node.

As the PTP standard specifically relies on the fact that the timestamps are generated from a single time source, it does not provide any solution to this situation (timestamps generated based on unrelated clock counters).

FIGS. 3a to 5 present an example of a prior art implementation of the device 301 where the disclosure may be implemented (architecture and sequence chart) ensuring the coherency of the clock of ingress and egress port (input and output port) and so allowing an accurate residence time computation.

Figure 3A:
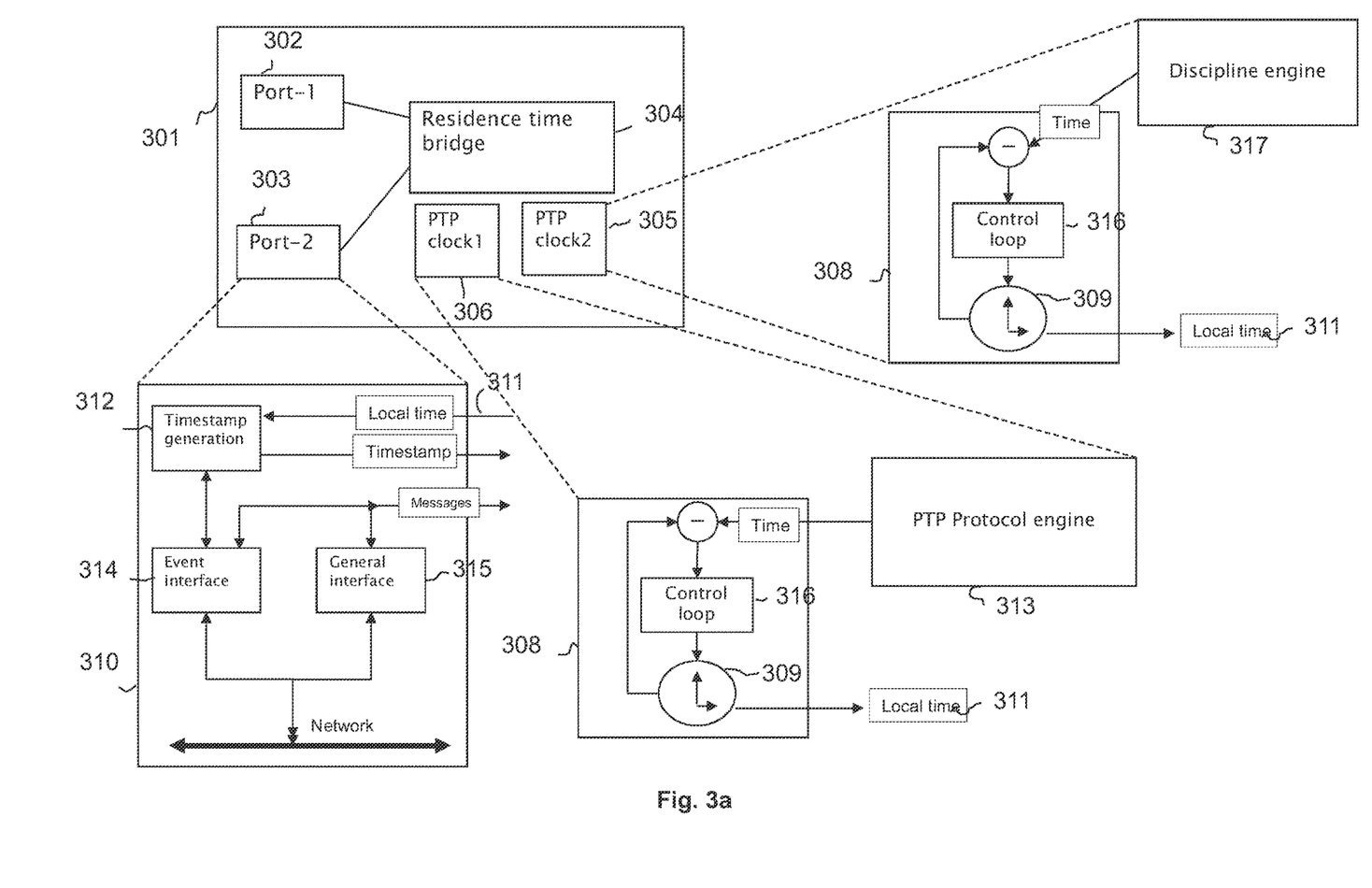
FIGS. 3a and 3b illustrate a two-port co-located OC/TC slave node.

FIG. 3a is a functional diagram that illustrates a two-port co-located OC/TC slave node (including a LAN board).

In this example, node 301 has two ports 302 (Port-1), 303 (Port-2) each having its own PTP clock 306 (PTP clock 1), 305 (PTP clock 2). The node also comprises a residence time bridge 304.

The port 303 is detailed in 310. It receives the local time 311 from the PTP clock 1 306. The port 303 comprises a timestamp generation unit 312, an event interface 314 and a general interface 305 both connected to the network. The port 302 has a similar architecture receiving its local time from the PTP clock 2 305.

Hence, PTP messages entering ports 1 or 2 are directed to the event interface 314 or the general interface 315 of the port. The event messages are provided a timestamp (generated in 312) when entering and leaving the port. Messages not destined to the local node are entering by one port and leaving by another port.

The PTP clock 306 is detailed in 308. It is composed of a time system 309 implementing an adjustable time counter whose role is to provide a synchronized time used to generate timestamps (in 312). Clock adjustment calculation is also based on the synchronized time and a control loop 316. The clock adjustments of the first clock 306 are determined by a PTP protocol engine 313, according to a PTP OC slave procedure.

The PTP clock 2 305 has a similar architecture but the clock adjustments are determined by a discipline engine 317 instead of the PTP protocol engine 313. The goal of the discipline engine detailed below is to keep the clock synchronized on the PTP clock 1 306. The PTP clock 1 is sometimes called "master clock" as it is the one synchronized on the server, while the PTP clock 2 is called "slave clock" as it is synchronized on the master clock.

In practice, when entering the first PTP port 301, the synchronization messages participating to the PTP protocol are first provided to the PTP protocol engine 313. The PTP protocol engine handles these messages according to the standard OC slave behavior. This results in the first clock 306 adjustment through the control loop 316. The set formed by the PTP protocol engine 313 and the associated control loop 316 is typically implemented as a software process running on the CPU 606 of FIG. 6.

Figure 6:
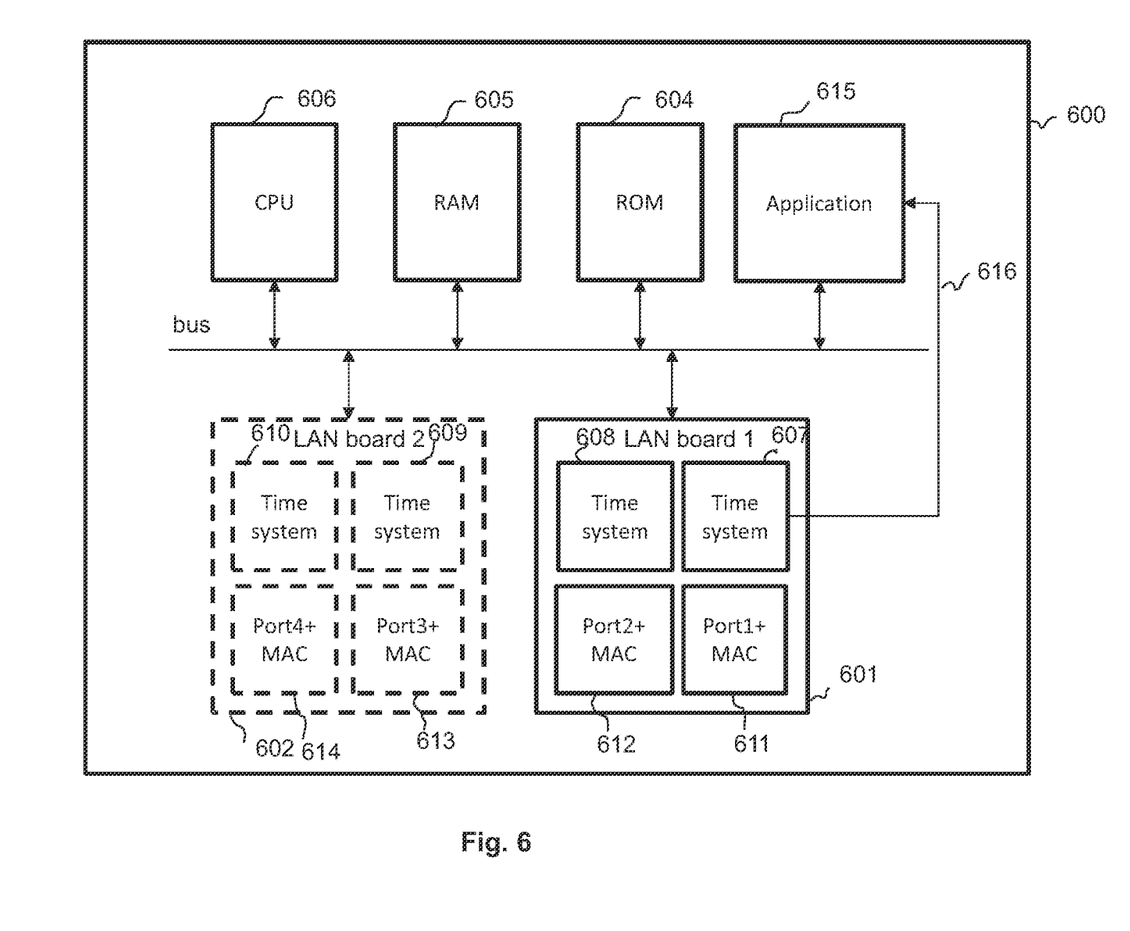
FIG. 6 illustrates an exemplary architecture of a combined OC/TC device.

Once the PTP protocol engine processing is done, the PTP messages are forwarded to the second port, for transmission along the chain, by the residence time bridge 304 while the other messages are forwarded without additional processing. The discipline process performed by the discipline engine 317 (as depicted for example in FIG. 4) and associated control loop 316 may be implemented as a software process running on the CPU 606 or may be a mixed hardware/software.

Event messages are handled by the residence time bridge 304 where the time spent by the event packet from reception to transmission is calculated as the difference between the incoming timestamp set in port 301 based on clock 306, and the outgoing timestamp set in port 303 based on clock 305. According to embodiments, this calculation is enhanced by taking into account the offset between the two clocks 306 and 305.

When entering the second port 303, the PTP messages transmitted backward to the synchronization master are directly provided to the residence time bridge 304 for processing.

The residence time bridge may be implemented as a software process running on the CPU 606.

Figure 3B:
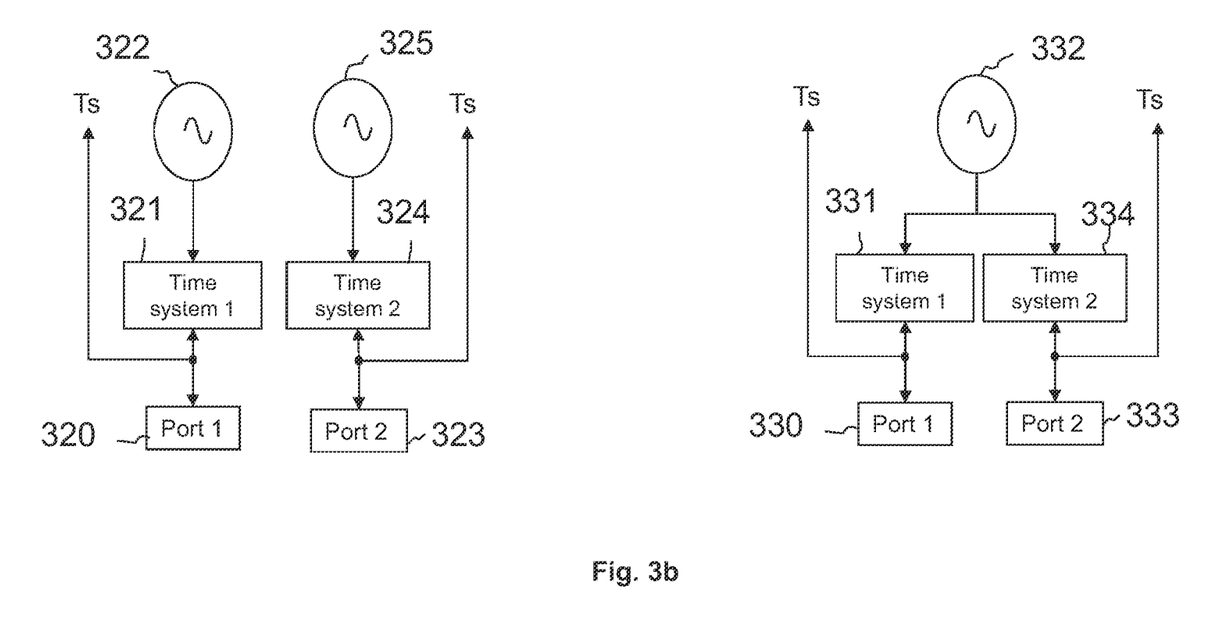

FIG. 3b shows a LAN board with a single oscillator and a LAN board with one independent oscillator for each port. The present disclosure applies to both cases.

At the left side of the figure, the first port 320 is associated with a first-time system 321 cadenced by a first oscillator 322. The second port 323 is associated with a second time system 324, which is cadenced by a second oscillator 325 which is independent from the first oscillator 322.

Thus, in this case, each time system follows the cadence of a different independent oscillator. Hence, the time counters (not shown) of each time system may have a different frequency bias compared to the Grand Master clock.

In practice, the first time system may be synchronized using a PTP process. The other time system may be synchronized on the first time system by a discipline process. In the case of more than two-time systems (or several LAN boards), a discipline process should be performed for each time system having its own independent oscillator. The PTP process is a regular master synchronization process, synchronizing regularly the first time system with a time-server.

The discipline process takes as input a reference time from the master port and a reference time from the targeted time system to be synchronized. The discipline process is a regular slave synchronization process synchronizing regularly a slave time system to the master-time system. These reference times can be either the time counter or a PPS output (PPS-assisted procedure, FIG. 4). A PPS (Pulse Per Second) is a physical clock signal usually running at 1 Hz, meaning one pulse per second. After processing the difference between the two references, the discipline process issues clock adjustment orders to the targeted time system.

At the right side of the figure, the first port 330 is associated with a first-time system 331 cadenced by an oscillator 332. The second port 333 is associated with a second time system 334, which is cadenced by the same oscillator 332.

In this case of a single oscillator, the oscillator 332 is used to provide the same cadence to the two different time systems 331 and 334. Hence, the time counters (not shown) of each time system will have the same frequency bias compared to the Grand Master clock. The discipline process for regulating the clock of the second time system 334 is thus simplified compared to the second time system 324.

In practice, an initial step of aligning the time counters is performed. Next, the adjustment of the first-time system is directly handled by the PTP process and the other time system receives the same clock adjustment as the first port as described with reference to FIG. 4. Hence, the clock adjustment orders (generated by the PTP process) result in perfect alignment of all the time systems during the whole system life.

In the case of more than two-time systems (or several LAN boards), a discipline process is necessary for each other board. The discipline process takes as input a reference from the master port of the first board and a reference from the first port of a second board. These references can be either the time counter (software-only procedure) or a PPS output (PPS-assisted procedure, FIG. 4). After processing the difference between the two references, the discipline process issues clock adjustment orders that are duplicated to all the time systems of the second board.

Figure 4:
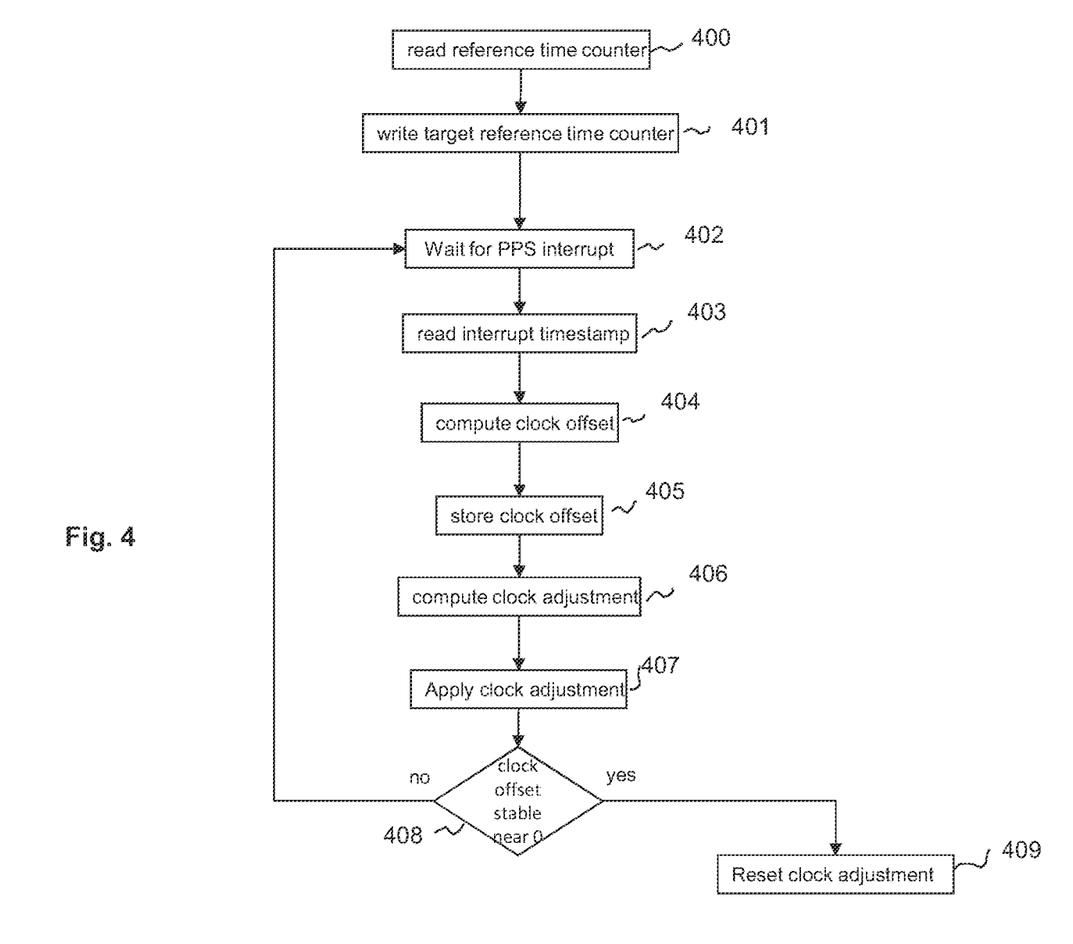
FIG. 4 illustrates steps of a time counter alignment process performed at the system start-up.

FIG. 4 illustrates steps of a time counter alignment process performed at the system start-up. In this figure, the time counter alignment process is PPS-assisted. This process can also be derived to be used by the discipline engine to keep two-time systems synchronized in the context where the two-time systems use independent oscillators as illustrated in the left part of FIG. 3b. In this case, the process skips test 408 and directly loops to step 402.

This process aims at aligning the time counter of a target time system with the time counter of a reference time system.

A PPS signal is generated by the reference time system. This PPS signal is input in the target time system. At each signal level change of the PPS signal, i.e., at each rising or falling edge of the PPS signal (electrical signal change between low level and high level), a timestamp is generated at the target time system. This process is executed by the CPU.

In the first two steps 400 and 401, the reference system time counter is read and its value is used to initialize the target system time counter. The purpose of this step is to make sure that the time counters of the two-time systems run within the same second.

At step 402, there is awaited an interrupt of the target time system indicating that a timestamp has been generated following a PPS input signal edge change (i.e., at each rising or falling edge of the PPS signal).

At step 403, the PPS timestamp is read.

At step 404, the frequency offset and the phase offset between the two-time systems are computed.

In practice the phase offset between the two-time systems may be equal to the part of the timestamp corresponding to the time below the second, because the 1 Hz PPS signal is generated by the reference system on a one second frontier (when the part of the timestamp corresponding to a number of seconds is changed).

At step 405, the computed clock offset (i.e., frequency and phase offsets) may be stored in the RAM memory as the initial clock offset so that it can be accessed later when the residence time of a message is computed.

At step 406, a clock adjustment is calculated to compensate for the clock offset computed at the previous step.

At step 407, the clock adjustment is applied to the target time system. In practice, the frequency can be adjusted for example by modifying the "time_inc" register and the time offset can be adjusted by modifying the "offset_correction" register.

When the calculated clock offset is stable near 0 i.e., the clock offset is below a threshold that depends on the accuracy required in the system (test 408), meaning that the time counters are aligned, the procedure can be stopped. Otherwise, the process loops at step 402. In practice, the calculated clock offset is considered as being stable for example if for 5 consecutive calculations (i.e., 5 loops) it is always near 0, or if it is low and has very little variation. In an example, for an accuracy in range of milliseconds, the clock offset should not exceed a few tens of microsecond order and for accuracy of microseconds, the clock offset should not exceed a few tens of nanosecond order. This threshold could also be determined by considering the number of cascaded nodes in the targeted topology of the system since the error may be cumulated through the nodes.

Another point to note is that in the single oscillator case (FIG. 3b), the clock offset should be 0 but in dual oscillator case, the clock offset may be different from 0.

When the procedure is finished, the process goes to a last step 409 where the clock adjustment order is reset at the target time system.

Figure 5:
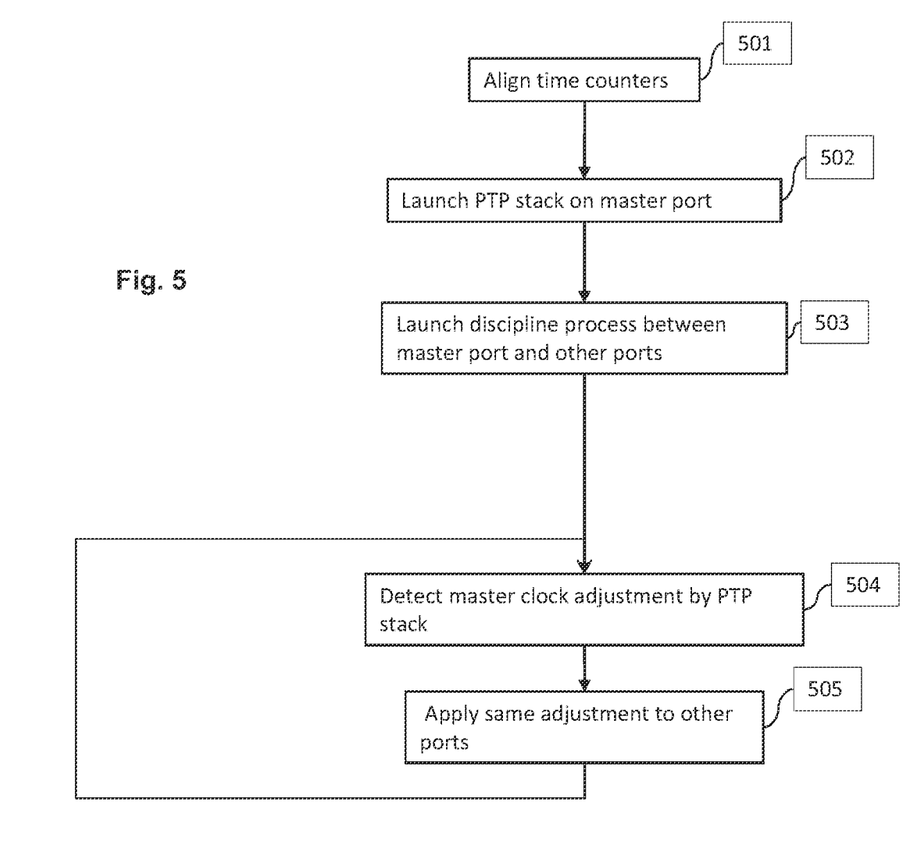
FIG. 5 illustrates steps performed from the system start-up and during runtime for maintaining the internal synchronization of clocks.

FIG. 5 illustrates steps performed from the system start-up and during runtime for maintaining the internal synchronization of clocks. As will be described below, each time the clock associated with the master port is adjusted to the Grand Master clock, the same adjustment is applied to all the other clocks associated with the other communication ports. It corresponds to the discipline process in the context where both time systems are using a same oscillator, as illustrated on the right part of FIG. 3b.

In this context, thanks to the single oscillator used by the master clock and the slave clock, once a first alignment of the two clocks is realized, the synchronization of the two clocks only requires to reproduce the PTP adjustments made on the master clock to the slave clock.

At step 501, the time alignment of all the time counters (of the master port and the other ports pair by pair) is performed. Examples of such time alignment process are described with reference to FIG. 4 (PPS-assisted).

At step 502, an OC PTP stack is launched in slave mode, i.e., the device is a slave and does not attempt to be the Grand Master reference time of the system. It aims at synchronizing the master port with the PTP Grand Master reference time.

At step 503, the remaining time systems of the node are synchronized with the master port. This internal process is called "discipline process". It is similar to the time alignment process described with reference to FIG. 4 (PPS-assisted) but without exit condition (step 408). At the difference with a system based on different oscillators, when a single oscillator is used for both time systems, the discipline process needs only to be run once at start up. During run time, it is only needed to report the PTP adjustments made on the master time system to the slave-time system (step 505).

Thus, the discipline process allows adjustment to a target clock with reference to a reference clock to be made by means of an intermediate synchronization signal representing the reference clock. In the software method, the intermediate reference signal is the time counter value and in the PPS assisted method the intermediate signal is the PPS signal.

In practice, the first time systems of all LAN boards are synchronized with the master-time system. Next, the other time systems of the LAN boards will be synchronized with the first-time system of their LAN board.

As the first LAN board implements a single oscillator for all-time systems, when, at step 504, it is detected that there is a master clock adjustment by the PTP stack, the clock adjustment (frequency and offset adjustments) is applied to all the time systems at step 505 and then the process loops back to step 504 so that each time there is a master clock adjustment by the PTP stack, the other clocks are also adjusted.

An alternative to synchronize several internal clocks in a device is presented in the document US 2013/0121347 Communication apparatus from Fujitsu Limited. This document explains that RTC (Real Time Clock) from transmission port is time-synchronized on RTC from reception port (which received PTP message) by using a hardware operation based on PPS/System CLK.

The above-mentioned paragraph presents architecture ensuring internal synchronization of the clock of the different ports of the slave nodes, for example, in a daisy-chain system (as described in FIG. 2) allowing to achieve an accurate synchronization in the whole system.

However, in the case of transient link failures, at link recovery, the link auto-negotiation process creates some instability on the clock of the port associated with the link. In many LAN boards, the clock driving the time synchronization is called the MAC clock. Thus, the instability on the MAC clock generates large error in the Ordinary Clock (OC) synchronization and in the residence time computation. Due to the cascading effect in a daisy chain, this error is cascaded to subsequent nodes in the daisy chain and the synchronization takes a long time (around 30 seconds). More generally, during link failure, clocks of different ports are no more locked to the timeserver and the deviation compared to the timeserver time may be different on the clock of each port. It would be advantageous to improve the recovery time after a transient link failure and to minimize the impact on the global synchronization of distributed control applications.

According to one aspect of the disclosure, the proposed solution is to resynchronize the desynchronized port on the other one prior to launch anew the whole synchronization process. The idea is that, when a port is desynchronized, for example due to a link failure, the other port keeps synchronized or at least near synchronization. The other port may be the master port, in that case, thanks to the PTP protocol, the master port stay synchronized in case of the second port losing its synchronization. The other port may be the second port, in that case, the other port continues to run in free running. It does not suffer from perturbation due to the link recovery of the other port. After the link recovery, the desynchronized port has been disrupted by the recovery while the other port is very close to synchronization due to its free running or thanks to PTP protocol. By resynchronizing the desynchronized port with the other port prior to resume the whole synchronization process, the synchronization error of the desynchronized port is reduced and the synchronization process will converge much faster. Resuming the whole synchronization process means to resume the PTP protocol when the desynchronized port is the master port or to resume the discipline engine when the desynchronized port is the slave port. Depending on embodiments, the synchronization problem may be detected by monitoring link failure or by detecting a loss of synchronization between the time systems of the different ports.

FIG. 6 illustrates an exemplary architecture of a combined OC/TC device 600 according to embodiments.

In this example, the device 600 comprises two dual port LAN boards 601 and 602. An example of architecture for such LAN board is described above with reference to FIG. 3a. The LAN boards 601 and 602 can be any LAN board with hardware timestamping support such as the Intel© Ethernet Server Bypass Adapter X540-T2 which implements independent oscillators for each port or the Intel© "Ethernet Converged Network Adapter X550-T2" which implements a common oscillator for all ports and so on.

The L2 bridge and the PTP stack functions performing the ratio and phase offset computation are stored in the ROM memory 604, copied at boot to the RAM memory 605 and executed by the CPU 606.

In this example, the device 600 has four network ports (611, 612, 613, 614) associated with four time systems (607, 608, 609, 610). The network ports are implemented on two different LAN boards. In the following description, it is assumed that the master port is Port 1 (611). In some embodiments, each LAN board may have its own master port.

The PTP stack is configured to obtain transmission and reception timestamps from the time systems attached to the network ports. It calculates the rate ratio of the master port clock 607 compared to the Grand Master (OC) and the phase offset of the master port clock 607 compared to the Grand Master (OC and OC/TC). It also adjusts the master port clock 607 in both frequency and offset.

The residence time function and the discipline process also run on the CPU 606. The Application 615 can be either an acquisition application or a rendering application. In this example, the application 615 is synchronized thanks to a Pulse Per Second PPS signal 616 issued from the time system 607 of one of the LAN boards.

Figure 7:
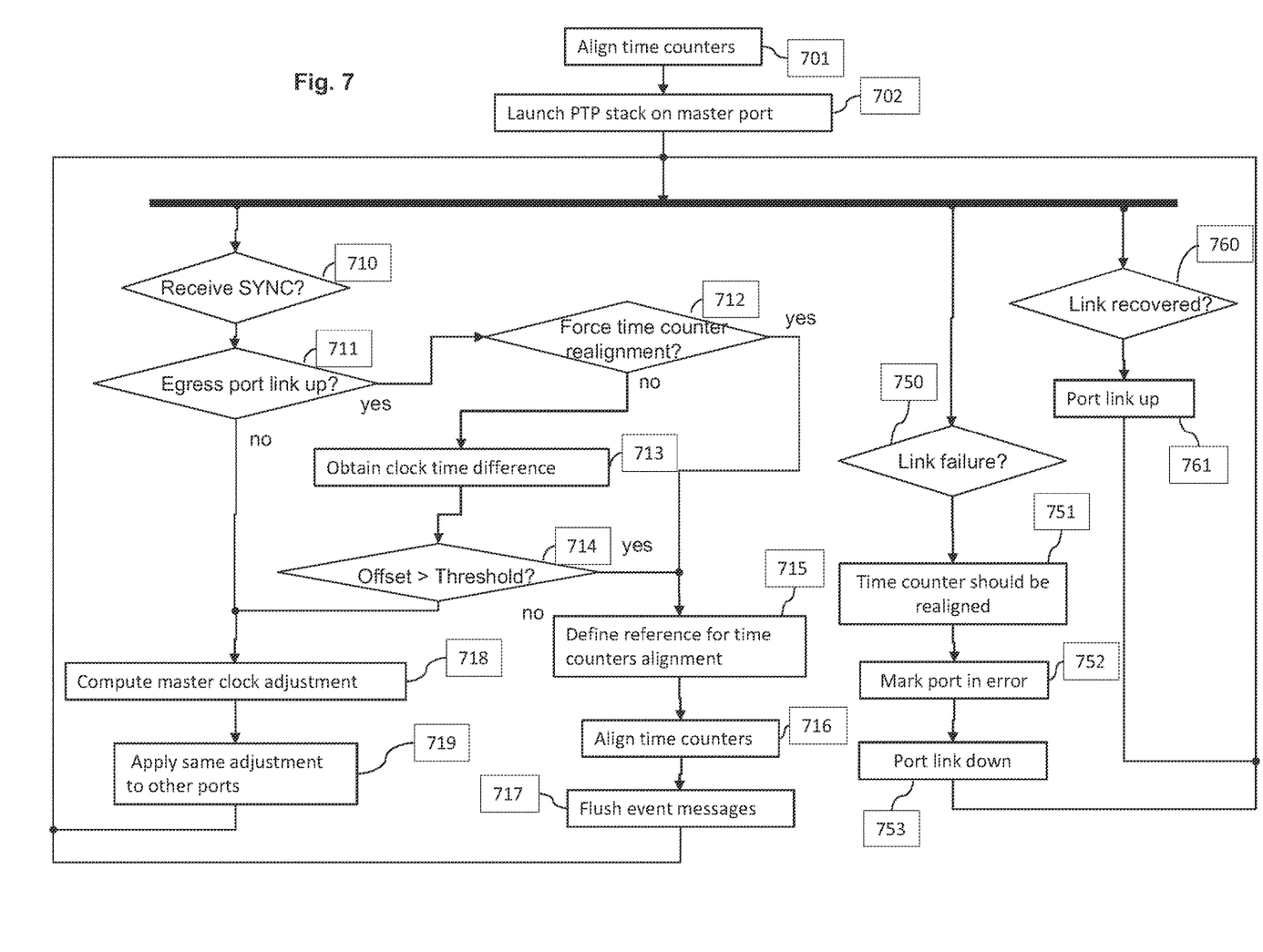
FIG. 7 illustrates the steps of a first embodiment of the present disclosure.

FIG. 7 presents steps performed from the system start-up and during runtime for maintaining the internal synchronization of clocks according to a first embodiment. This process illustrates a way to reduce time to synchronization, for instance after a link failure/recovery. The figure represents the disclosure with only two ports (one ingress and one egress port), but the same would apply to a device comprising further ports. This embodiment is based on monitoring the link status to detect link failure. Accordingly, at link recovery, the port corresponding to the link failure is first synchronized with the other port. This synchronization occurs before resuming PTP synchronization when the faulty port is the master port.

At step 701, the time alignment of all the time counters (of the master port and the other ports pair by pair) is performed. Examples of such time alignment process are described with reference to FIG. 4 (PPS-assisted).

At step 702, a process running an OC slave PTP stack is launched. It aims at synchronizing the master port with the PTP Grand Master reference time.

In practice, the first time system of all LAN boards is synchronized with the master-time system. Next, the other time systems of the LAN boards are synchronized with the first-time system of their LAN board.

In a steady phase, the system monitors the reception of sync messages from the timeserver and change of link status for the different ports (ingress/egress).

Link Status Monitoring:

As explained previously, at link recovery, the link auto-negotiation process creates some instability on the MAC clock frequency. It generates large errors in the Ordinary Clock (OC) synchronization so it is necessary to perform anew the time counter alignment. In case of link failure detection in step 750, the system, in step 751, enables a flag to force the realignment of the time counter when the link recovery (and so auto-negotiation) occurs. In step 752, the system marks the port for which link failure has occurred as "in error". This indication is used in step 715 to choose the correct reference time counter for the time counter realignment. In step 753, the system changes the link status for the port to "down". The idea here is to indicate to the system that a synchronization needs to be realized when all links involved in the synchronization process are activated anew, and to indicate which link was faulty to avoid a time system to synchronize with the time system associated with the faulty link.

At link recovery detection, in step 760, the system changes the link status for the port to "up" in step 761.

Reception of Sync Message:

At step 710, upon reception of a sync message, the system checks the egress port link status, in step 711. It is worth noting that the link status is only checked for the egress port, because reception of sync a message implies that the link is up for the ingress port. Different cases may occur.

In the normal case, ingress and egress ports are up and their time counters are aligned. In this case, at step 711, if the link of the egress port is up, the system checks in step 712 whether a time counter realignment is required because a link recovery has just occurred. If a time counter realignment is required, the system goes to step 715. Otherwise, the system obtains the clock time difference, i.e., the offset between ingress port (Ordinary Clock connected to Grand Master clock) and egress port, in step 713. This offset can be obtained by reading time system of the ingress port and time system of the egress port. The offset is the difference between both time systems. The computation preferably considers the time elapsed between the two sequential readings of the time counters.

Following step 713, in step 714, the obtained offset is analyzed to determine whether ingress and egress port are synchronized, i.e., if the offset is near or equal to zero, for example when the clock offset is below a threshold that depends on the accuracy required in the system. In an example, for an accuracy in range of milliseconds, the clock offset should not exceed a few tens of microsecond order, and for accuracy of microseconds, the clock offset should not exceed a few tens of nanosecond order. This threshold could also be determined by considering the number of cascaded nodes in the targeted topology of the system since the error may be cumulated through the nodes.

If the offset is near or equal to zero, step 718 computes the master clock adjustment to be applied to the ingress port (Ordinary Clock) in order to maintain synchronization to Grand Master clock according to PTP protocol.

In step 719, the same clock adjustment is performed to the egress port to maintain synchronization between the two ports.

In case of link failure of the egress port: ingress port is up and egress ports is down.

When the result of test 711 is negative, it means that the system has detected a link failure on the egress port (in step 750), and that the link has been marked as "down" (in step 753). Consequently, the system goes directly to step 718.

In step 718, the system computes the master clock adjustment to apply to the ingress port (Ordinary Clock), in order to maintain synchronization to the Grand Master clock according to the PTP protocol.

In step 719, the same clock adjustment is performed to the egress port to maintain the synchronization in between the two ports.

In case of link recovery to the ingress or egress port: ingress port and egress ports are up.

At step 711, if the link of the egress port is up, the system checks in step 712 whether a time counter realignment is required because a link recovery has just occurred. If a time counter realignment is required, the system goes to step 715.

The system could also request a time counter realignment in step 714 if the offset from step 713 is above a certain threshold that depends on the accuracy required in the system, the system goes to the recovery phase in which a new time counter alignment occurs. In an example, for an accuracy in range of milliseconds, the clock offset should not exceed a few tens of microsecond order and for accuracy of microseconds, the clock offset should not exceed a few tens of nanosecond order. This threshold could also be determined by considering the number of cascaded nodes in the targeted topology of the system since the error may be cumulated through the nodes.

Contrary to the initialization phase wherein the port connected to a time-server is always used as reference to align the time counter of other ports, in step 715, the system looks for the most efficient port to be used as reference to realign the time counter of the ports. The time counter realignment aims to correct the time counter of the port marked as "in error". In the single oscillator case, the system selects as reference one port without error: all slave ports are a perfect copy of the master port, because the oscillator is the same and the steps 701 and 719 ensure perfect synchronization between the ports. If the master port was the one in error, the slave port is used as the reference for the time counter realignment; otherwise the master port is used as the reference to realign the slave port. The goal here is to synchronize the port that was in error to one of the other ones, because this port is the one that presents the greater error compared to the grand master clock.

When the reference is selected, the system performs in step 716 time counter alignment similar to step 701, but by using the new reference from step 715.

At the end of the time counter alignment procedure, in step 717, the system has to flush all event messages received on the port in error, i.e., sync message 101 for master port or delay request message 103 for slave port. This is to avoid messages with erroneous timestamp (messages timestamped before or during the time counter realignment). Messages with erroneous timestamps may indeed disturb the synchronization process not only of the local node, but also of subsequent nodes in a daisy chain. Thus, this can delay resynchronization during link recovery.

Figure 8:
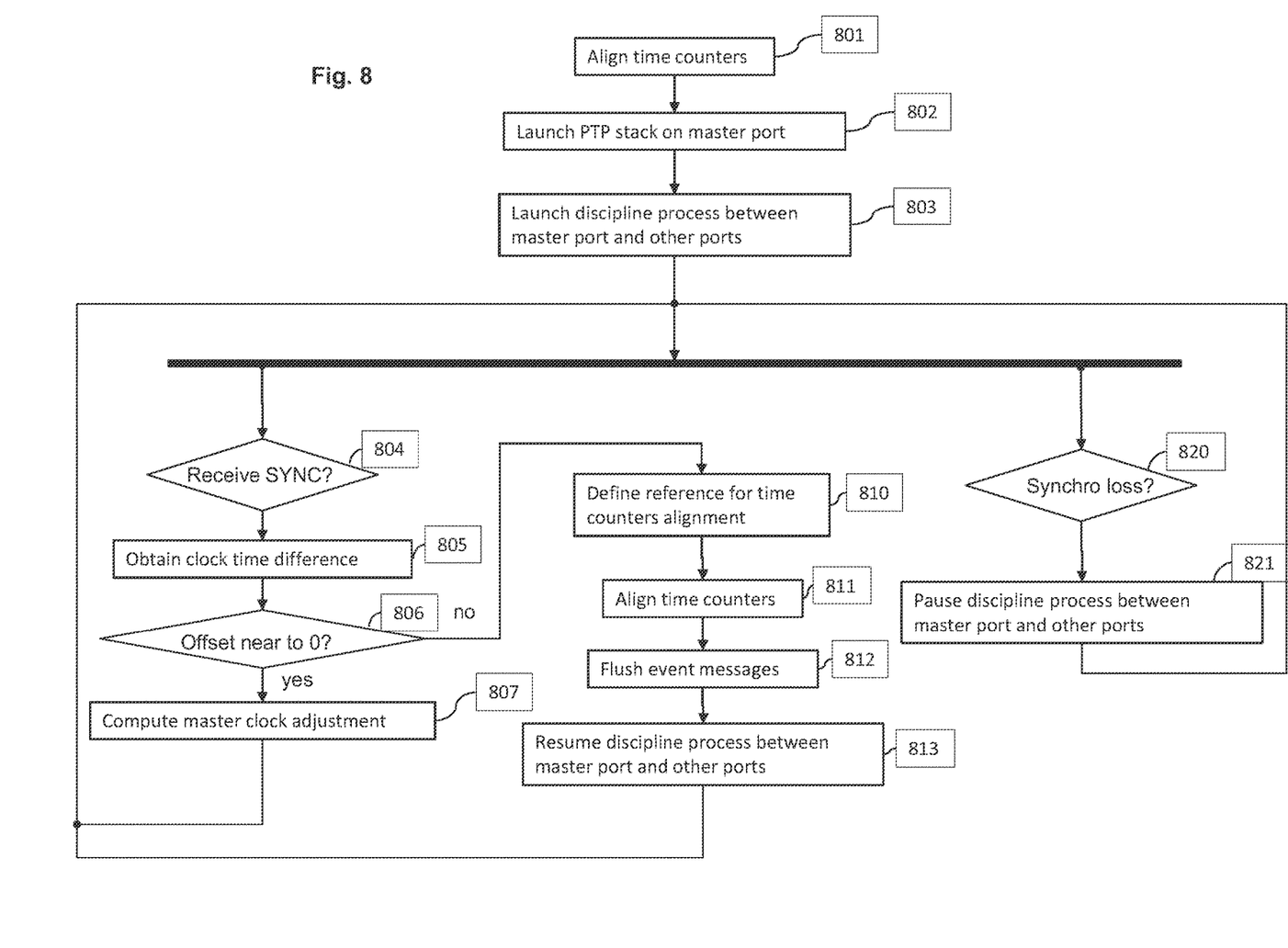
FIG. 8 illustrates the steps of a second embodiment of the present disclosure.

FIG. 8 presents the steps performed by the system at start-up and during runtime, for maintaining the internal synchronization of clocks according to a second embodiment. The described process illustrates a way to reduce the synchronization time, for instance after a link failure/recovery. This figure is better adapted to systems with several oscillators and which require a disciplined process to synchronize slave ports on master port and to compensate the oscillator drifts. This embodiment is based on monitoring the loss of synchronization between the different time systems associated to the different ports. When a loss of synchronization is detected, the discipline process synchronizing the different time systems is paused. At recovery, a synchronization of the time systems on the one which is the nearest of the grand master clock is undertaken before resuming the regular synchronization processes.

During initialization phase, in step 801, the time alignment of all the time counters (of the master port and the other ports pair by pair) is performed. Examples of such time alignment process are described with reference to FIG. 4 (PPS-assisted).

This first step may be skipped for LAN boards implementing independent oscillators for each time system.

At step 802, a process running an OC slave PTP stack is launched. It aims at synchronizing the master port with the PTP Grand Master reference time.

At step 803, the remaining time systems of the node are synchronized with the master port. This internal process is called "discipline process". It is similar to the time alignment process described in FIG. 4 (PPS-assisted), but without exit condition, hence this process is performed continuously during runtime. Thus, the "discipline process" allows adjustments to a target clock with reference to a reference clock to be made by means of an intermediate synchronization signal representing the reference clock. In the software method, the intermediate reference signal is the time counter value and, in the PPS assisted method, the intermediate signal is the PPS signal.

In practice, the first time systems of all LAN boards are synchronized with the master-time system. Next, the other time systems of the LAN boards are synchronized with the first-time system of their LAN board.

During a steady phase, the system monitors the reception of sync message from the timeserver and the synchronization loss.

At step 804, upon reception of a sync message, the system obtains the clock time difference, i.e., the offset between the ingress port (Ordinary Clock connected to Grand Master clock) and the egress port (step 805). This offset can be obtained by reading the time system of the ingress port and the time system of the egress port. The offset is the difference between both time systems. The computation preferably considers the time elapsed between the two sequential readings of the time counters. The offset can also be obtained by reading the last offset computed by discipline process launched in step 803 and described in FIG. 4 (PPS-assisted).

In step 806, the obtained offset is analyzed to know whether the ingress and the egress port are synchronized, i.e., if the offset is near or equal to zero or in other words if the offset is below a threshold that depends on the accuracy required in the system. In an example, for an accuracy in range of milliseconds, the clock offset should not exceed a few tens of microsecond order and for accuracy of microseconds, the clock offset should not exceed a few tens of nanosecond order. This threshold could also be determined by considering the number of cascaded nodes in the targeted topology of the system since the error may be cumulated through the nodes.

If the offset is near or equal to zero, the step 807 computes the master clock adjustment to apply to the ingress port (Ordinary Clock) in order to maintain synchronization to the Grand Master clock according to the PTP protocol.

When a synchronization loss is detected in step 820, the discipline process is stopped in step 821. Consequently, all ports are in free-running mode and follow the rhythm of their own oscillator. It is to be noted that a link failure on the slave port does not involve generally a loss of synchronization as the slave port stays synchronized on the master port thanks to the discipline process. A loss of synchronization typically occurs due to a link failure on the master port. In any case, the described process works whatever port is desynchronized.

The recovery is detected upon reception of a sync message meaning that the link on the master port is up again, associated with a large offset detected in step 806, indicating that the ports are not synchronized. The idea here is to use the sync message to compute the offset of the master port with the grand master, and not to execute the PTP protocol. Then, each port knowing its own offset with the master port and knowing the offset between the master port and the grand master clock, it is possible to determine for each port its offset with the grand master. A synchronization is made of all port on the port with the smallest offset with the grand master.

If the offset from step 805 is above a certain threshold (which depends on the accuracy required in the system), for instance after a period of free running mode during a synchronization loss phase, the system goes to the recovery phase in which a new time counter alignment occurs. Contrary to the initialization phase where the port connected to the time-server is always used as a reference to align the time counter of other ports, in step 810, the system looks for the most synchronized port to be used as reference. As the clock discipline process has been stopped in step 821, each port has different offsets with timeserver. The best port to use as reference is the one with the smallest offset with the grand master. The system computes the offset of each port with the timeserver in order to select the reference for the time counter alignment.

When the reference is selected, the system performs the time counter alignment similar to that of step 801, but by using the new reference in step 810.

At the end of the time counter alignment procedure, in step 812, the system has to flush all event messages received on the ports during this synchronization, i.e., sync message 101 for master port or delay request message 103 for the slave ports. This is to avoid sending messages with erroneous timestamps (messages timestamped before or during the time counter realignment). Messages with erroneous timestamps may disturb the synchronization process not only of the local node; but also the subsequent nodes in a daisy chain. Thus, this can delay the resynchronization at link recovery.

Then, in step 813, the discipline process is resumed to maintain synchronization in between the different ports.

The PTP synchronization of the master port will be resumed on the next reception of a sync message in step 807.

Both described embodiments, by resynchronizing internally the different ports on a reference port that is not the one that caused the desynchronization before resuming the PTP protocol, allow a faster global resynchronization of the system. It is to be noted that while the description is based on the PTP protocol, any time protocol allowing the synchronization of a master clock to a synchronization server clock may be used in the same way.

Although the present disclosure has been described herein above with reference to specific embodiments, the present disclosure is not limited to the specific embodiments, and modifications will be apparent to a skilled person in the art, which lie within the scope of the present disclosure.

Many further modifications and variations will suggest themselves to those versed in the art upon making reference to the foregoing illustrative embodiments, which are given by way of example only and which are not intended to limit the scope of the disclosure, that being determined solely by the appended claims. In particular the different features from different embodiments may be interchanged, where appropriate.

Each of the embodiments of the disclosure described above can be implemented solely or as a combination of a plurality of the embodiments. Also, features from different embodiments can be combined where necessary or where the combination of elements or features from individual embodiments in a single embodiment is beneficial.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of synchronization of a communication device comprising a first and second communication ports, each of the first and second communication port being associated with a respective first and second time system, the method comprising:
   a regular master synchronization process synchronizing regularly the first time system with an external synchronization server according to a time synchronization protocol;
   a regular slave synchronization process synchronizing regularly the second time system with the first-time system;
   detecting a loss of synchronization between the first and the second time system due to a link failure; and
   determining which of the first and the second time system is desynchronized,
   wherein when it is determined that the first time system is desynchronized, then the first time system is synchronized with the second time system and when it is determined that the second time system is desynchronized, then the second time system is synchronized with the first time system.

2. The method of claim 1, wherein the desynchronized time system is the first time system, and wherein the method further comprises after the synchronizing step:
   resuming the regular master synchronization process.

3. The method of claim 1, wherein the method further comprises:
   suspending the regular slave synchronization process when the determined desynchronized time system is the second time system; and
   resuming the regular slave synchronization process after the synchronizing step.

4. The method of claim 1, wherein detecting the loss of synchronization is made by detecting an offset between the first and second time system greater than a determined threshold.

5. The method of claim 1, wherein detecting the loss of synchronization is made by detecting a link failure on one of the first or second communication ports.

6. The method of claim 5, wherein upon detection of the link failure, the method comprises:
   enabling a flag to force the synchronization at link recovery; and
   marking the port on which the link failure is detected as down.

7. The method of claim 1, wherein time protocol messages received are discarded before resuming the regular master synchronization process.

8. The method of claim 1, wherein time protocol messages carrying timestamps received are discarded before resuming the regular master synchronization process.

9. The method of claim 1, wherein the first and the second time system use the same oscillator.

10. The method of claim 1, wherein the first and the second time system use different oscillators.

11. A non-transitory computer-readable storage medium storing instructions of a computer program for implementing a method of synchronization of a communication device comprising a first and second communication ports, each of the first and second communication port being associated with a respective first and second time system, the method comprising:
- a regular master synchronization process synchronizing regularly the first time system with an external synchronization server according to a time synchronization protocol;
- a regular slave synchronization process synchronizing regularly the second time system with the first-time system;
- detecting a loss of synchronization between the first and the second time system due to a link failure;
- determining which of the first and the second time system is desynchronized,
- wherein when it is determined that the first time system is desynchronized, then the first time system is synchronized with the second time system and when it is determined that the second time system is desynchronized, then the second time system is synchronized with the first time system.

12. A communication device comprising a first and second communication ports, each of the first and second communication port being associated with a respective first and second time system, the device comprising a hardware processor configured for:
- executing a regular master synchronization process synchronizing regularly the first time system with an external synchronization server according to a time synchronization protocol;
- executing a regular slave synchronization process synchronizing regularly the second time system with the first-time system;
- detecting a loss of synchronization between the first and the second time system due to a link failure;
- determining which of the first and the second time system is desynchronized,
- wherein when it is determined that the first time system is desynchronized, then the first time system is synchronized with the second time system and when it is determined that the second time system is desynchronized, then the second time system is synchronized with the first time system.

* * * * *